Patented Feb. 14, 1928.

1,658,828

UNITED STATES PATENT OFFICE.

AUGUST AMANN, OF WIESBADEN, GERMANY, ASSIGNOR, BY MESNE ASSIGNMENTS, TO CHEMISCHE FABRIKEN DR. KURT ALBERT G. M. B. H., OF BIEBRICH-ON-THE-RHINE, AMOENEBURG, GERMANY, A CORPORATION OF GERMANY.

RESINOUS BODIES PRODUCED FROM FORMALDEHYDE AND COLOPHONY AND METHOD OF PRODUCING SAME.

No Drawing.   Application filed August 7, 1924. Serial No. 730,739.

This invention relates to a combination product of formaldehyde and a natural resin such as colophony as an intermediate product, and to various combinations thereof with other materials. Other natural resins besides colophony may me used, but because of their cost there is at the present time no commerical application of the invention to such other resins, and therefore in this application I refer solely to colophony; it is to be understood, however, that the invention may, if desired, be appplied to other similar resins which are intended to be included.

According to my invention, I am able to produce a combination of colophony and formaldehyde which has a melting point practically no higher than that of the original colophony and which can be heated to a temperature of 120° C., without the evolution of any substantial quantity of free formaldehyde, but which is adapted to evolve substantial quantities of free formaldehyde if heated above 135° C. I do not know whether this product is a true chemical combination or whether it is in the nature of a solution of formaldehyde in the colophony, but either of these forms of material, or other forms, are intended to be covered when I refer to a combination between colophony and formaldehyde.

I recognize that colophony has been treated in the past with formaldehyde, but in such instances the treatment is carried on in such a way as substantially to raise the melting point of the product above that of the original resin treated. Such prior treatments were carried on at temperatures of 150° C. or higher, whereas, according to the present invention, it is important that the treatment of the colophony with the formaldehyde should be carried on at temperatures which preferably are not raised above 130° C. and should never be raised above 135° C. It is to be understood that the formaldehyde may be used in any desired form, that is, I can use an aqueous solution of formaldehyde or formaldehyde gas, or paraformaldehyde. All of these forms are intended to be covered by the single term formaldehyde.

When preparing the product of this invention which I have given the name of "formaldehydecolophony," it is best first to melt the colophony and then add the formaldehyde in the form of a polymer, such as paraformaldehyde, at a temperature of from 110° to 120° C. The time necessary will depend both upon the temperature employed and the percentage of formaldehyde. For example, when colophony is heated to temperature of from 110° to 120° C. and treated with 10% of paraformaldehyde, the material will ordinarily be completed and all of the formaldehyde will be bound by the colophony in something under twenty hours and the batch may be allowed to cool.

If the formaldehyde is used in the form of an aqueous solution, the temperature should be maintained about the boiling point of the water (while using a reflux condenser) until substantially all of the formaldehyde has entered into the combination; the water may then be blown off or distilled off at ordinary pressure or in vacuum. In order to accelerate the combination, pressure may be used, and this is particularly applicable where aqueous solutions of formaldehyde are substituted for paraformaldehyde, as it permits the temperature to be raised above 100° C. It will also be found advisable to stir the mixture while the reaction is going on, as this aids the combination and prevents local heating.

If for any reason, one wishes to use the maximum permissible temperature, this can be ascertained either by making up a small batch of the ingredients at a temperature somewhat above the melting point of the resin employed (for example, with colophony at a temperature of about 120° C.) and then heating the resulting product to ascertain the temperature at which free formaldehyde is evolved; or the batch can be carefully watched, as the evolution of formaldehyde will start to cause forming when the critical temperature is reached. The production temperature should be maintained slightly below this critical point which with colophony is about 135° C. As a minimum temperature I may set the melting point of the resin treated.

The product resulting from this combination is of value, for it firmly retains the formaldehyde at low temperatures, but will split off large quantities of formaldehyde at higher temperatures. It can thus be used as a base for making other products, such, for example, as various bodies comprising the reaction products of phenol, formaldehyde and colophony which may be produced by combining the formaldehydecolophony either with a phenol or with a more complicated phenolic body, such as a phenolic resin. In this application where I use the word "phenol" I intend to include all those products derived from hydroxy benzol, which have hydrogen atoms able to react with free formaldehyde. All the phenols hitherto used for making phenolresins with formaldehyde, are therefore suitable for the reaction with formaldehydecolophony.

The reaction between the formaldehydecolophony and the phenols may go on above or below the temperature at which the formaldehydecolophony, heated alone, is decomposed to hardened resin and free formaldehyde. In some cases it may be advantageous to add suitable solvents such as benzol, turpentine, or the like. If the reaction takes place below this critical temperature, resins are obtained in which many single phenol molecules are combined with single colophony molecules. If the mixture of formaldehydecolophony and phenols is quickly heated, to a high temperature, i. e., 150° C. and more, the formaldehyde is split off more rapidly than the formaldehydecolophony may combine with the phenols. This free formaldehyde then reacts upon the phenols. However, part of the still undecomposed formaldehydecolophony will now react on these phenolresins, so that a mixture of products of colophony and phenols and of colophony and phenolresins is formed. The reaction between the formaldehydecolophony and the phenols may be accelerated by suitable catalysts such as small quantities of acids or alkalis. If I take acids, I may obtain products consisting for the most part of single colophony molecules combined with single phenol molecules, even at low temperatures, especially when I take a large excess of phenol, the excess being afterwards removed by distillation. If I take alkali, the formaldehyde which is split off by the formaldehydecolophony is very quickly bound by the phenols.

The high value of my new invention consists especially in that it allows one to combine phenols very firmly with colophony and in such a manner that the resulting products are very similar to natural copal gums. It may be that similar products are even contained in natural resins, as it has been found that part of the oils distilling over when the copals are run, consist of phenolic bodies. By suitable methods these new resins which I obtain by my process may further be changed in several directions, so that the qualities of the final products even surpass those of the natural copal gums more or less. They may, for instance, be heated at high temperatures, for example, 200° C., to combine the free carboxyl group of the colophony nucleus with the free hydroxyl group of the phenol nucleus, within the same resin molecule, giving by this reaction absolutely neutral resins, whereas natural copal gums are very acid. Or they may easily be esterified by glycerin, or neutralized by metal oxides.

As an alternative, fusible and soluble, as well as infusible and insoluble resins may be obtained by combining formaldehydecolophony with phenolresins. By the word "phenolresins", I intend to include all those resins which may be obtained by the combination of a phenol with products containing at least one carbonyl group, as for instance, various aldehydes or ketones such as formaldehyde, acetaldehyde, benzaldehyde, acetone and benzophenone.

Heretofore, the colophony has usually been used to change the qualities of the phenolresins in some respects. In some processes colophony is added in compartively small quantities to phenolresins and is rendered infusible and insolube on heating, in order to obtain products which at higher temperatures, are more or less plastic, but do not melt. If the percentage of colophony is high enough, these infusible and insoluble phenol-formaldehyde resins may even be transformed into soluble and fusible resins, if the mixture is heated at temperatures above 200° C.

In other processes, colophony is added to mixtures of phenols and aldehydes as a catalyst, or in order to make the phenolresins soluble in fatty oils. In such processes the percentage of colophony is kept as low as possible to prevent the mixture from having too low a melting point or other qualities which, for varnish making purposes, would diminish the value of the mixture in a higher degree than it would be increased by the oil solubility. If, for instance, 7 parts of colophony are melted together with 1 part of a phenol-formaldehyde resin with a melting point of about 100° C., the mixture may show a melting point as low as 70° C.

My method allows me, however, to improve the qualities of colophony to a very large extent by using comparatively small quantities of phenolresins. When I heat 7 parts of formaldehydecolophony, which contains only 5% of formaldehyde, with 1 part of the same type of phenolresin as referred to above, I obtain a new kind of resin with a melting point above 100° C. It may be noted that while the product obtained by melting together 7 parts of colophony and 1 part of the phenolresin at a temperature of 150-180° C., is almost entirely a physical mixture of the two resins, the product which I obtain by heating the mixture of formaldehydecolophony and penolresin, first, at 130–140° and then at 150–180° is a new product in which the colophony is very firmly chemically combined with the phenolresin.

If a phenolresin of the type which will remain always fusible and soluble when heated with too much formaldehydecolophony, made with 8 to 10% of formaldehyde, the mixture becomes very quickly infusible and even chars if one tries to make the mixture fusible again by raising the temperature. The result is, therefore, quite contrary to that obtained in transforming infusible phenolresin into fusible and soluble resins by heating them with a large quantity of colophony.

The ratio of the formaldehydecolophony to the phenolresins may be varied within a large range. If cheaper products are to be manufactured, which need not have a very high melting point, large proportions of formaldehydecolophony may be used. If very hard products are to be manufactured, a formaldehydecolophony, with the highest percentage of formaldehyde that can be obtained should be used.

What I claim is:

1. The process of treating colophony with aqueous formaldehyde, which comprises heating the same with aqueous formaldehyde at a temperature above the melting point of the colophony but below the temperature at which substantial foaming will take place.

2. The process of treating colophony with formaldehyde, which comprises heating the same with formaldehyde below 135° C.

3. The process of treating colophony with formaldehyde, which comprises heating the same with formaldehyde in the presence of alkali in such a manner that the colophony is practically not hardened but contains the formaldehyde groups, still in a very reactive form.

4. As a new composition of matter, a resinous reaction product of colophony and formaldehyde with a melting point nearly as high as that of the original colophony, the colophony being combined with formaldehyde in such a manner that the formaldehyde groups are present in a very reactive form.

5. As a new composition of matter a resinous reaction product of colophony and formaldehyde which will yield substantially no free formaldehyde at temperatures below 120° C. but which will yield substantial quantities of free formaldehyde when heated above 135° C.

6. The process of producing a resinous body which comprises the steps of treating colophony with formaldehyde at a temperature below 135° C., and thereafter treating the resulting product with a phenol resin.

7. A process as described in claim 6 in which said final reaction is carried out at a temperature below 135° C.

8. As a new composition of matter, a resinous material comprising a colophony derivative but having a melting point much higher than colophony, the same being a reaction product of colophony treated with formaldehyde at a temperature below 135°, and thereafter treating the resulting product with a phenolic body.

9. As a new composition of matter, a resinous material comprising a colophony derivative but having a melting point much higher colophony, the same being a reaction product of colophony treated with formaldehyde at a temperature below 135°, which in turn is treated with a phenolic body at a temperature below 135° C.

10. As a new composition of matter a resinous body being the reaction product of a phenolic body and the material produced by treating colophony with formaldehyde at a temperature below 135° C.

AUGUST AMANN.